United States Patent
Bhide et al.

(10) Patent No.: US 9,152,662 B2
(45) Date of Patent: Oct. 6, 2015

(54) DATA QUALITY ANALYSIS

(71) Applicant: TATA CONSULTANCY SERVICES LIMITED, Mumbai (IN)

(72) Inventors: Anand Shankar Bhide, Pune (IN); Gopinath Talluri, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 133 days.

(21) Appl. No.: 13/741,761

(22) Filed: Jan. 15, 2013

(65) Prior Publication Data

US 2013/0185309 A1 Jul. 18, 2013

(30) Foreign Application Priority Data

Jan. 16, 2012 (IN) .......................... 148/MUM/2012

(51) Int. Cl.
*G06F 17/30* (2006.01)
*G06Q 10/06* (2012.01)

(52) U.S. Cl.
CPC .......... *G06F 17/30336* (2013.01); *G06Q 10/06* (2013.01)

(58) Field of Classification Search
USPC ......................................................... 707/748
See application file for complete search history.

(56) References Cited

U.S. PATENT DOCUMENTS

| | | | |
|---|---|---|---|
| 7,769,726 B2 | 8/2010 | Gitai et al. | |
| 7,865,507 B2 | 1/2011 | Namait et al. | |
| 8,321,387 B2 * | 11/2012 | Dettinger et al. | 707/694 |
| 2005/0125422 A1 | 6/2005 | Hirst | |
| 2008/0195430 A1 * | 8/2008 | Rustagi | 705/7 |
| 2009/0024551 A1 | 1/2009 | Agrawal et al. | |
| 2010/0241641 A1 * | 9/2010 | Byun et al. | 707/757 |
| 2011/0138312 A1 * | 6/2011 | Yeh et al. | 715/771 |
| 2012/0197919 A1 * | 8/2012 | Chen et al. | 707/757 |
| 2013/0006931 A1 * | 1/2013 | Nelke et al. | 707/625 |
| 2013/0055042 A1 * | 2/2013 | Al Za'noun et al. | 714/746 |
| 2013/0080197 A1 * | 3/2013 | Kung et al. | 705/7.11 |

OTHER PUBLICATIONS

European Search Report, Apr. 4, 2013, for EP 13 15 1479, 2 pages.

* cited by examiner

*Primary Examiner* — Debbie Le
(74) *Attorney, Agent, or Firm* — Seed IP Law Group PLLC

(57) ABSTRACT

The present subject matter relates to systems and methods for determining quality of data. In one implementation, the method comprises identifying at least one column of the data repository based on an importance index associated with the at least one column, wherein the importance index is indicative of the criticality of the data stored in the at least one column; and retrieving at least one data quality analysis rule associated with the at least one column. The method further comprises assigning a rule weightage parameter to each of the at least one data quality analysis rule and a column weightage parameter to each of the identified columns and analyzing the data stored in the identified columns based on the at least one data quality analysis rule. Based in part on the analysis a data quality score, indicative of the quality of data stored in the data repository is computed.

7 Claims, 2 Drawing Sheets

DATA QUALITY ANALYSIS

TECHNICAL FIELD

The present subject matter is related, in general to data quality in a computing environment and, in particular, but not exclusively to a method and system for determining a data quality score in the computing environment.

BACKGROUND

Data quality is an assessment of the suitability of data to serve its purpose in a given context. Data quality generally pertains to various aspects of the data, which are indicative of the suitability of data, such as accuracy, completeness, update status, relevance, consistency of data across various data sources, reliability, appropriate presentation, and accessibility by various stakeholders. Usually data quality measures include standardizing source data fields; ensuring consistency in the data; validating, certifying, and enriching common data elements; and using trusted data sources.

Other conventional techniques of enhancing data quality include analyzing, and identifying improved standardization, validation, and matching processes; comparing data across or within data sources to check consistency of data; ensuring removal of duplicate data; and developing relationships among common entities from different sources, for example by creating foreign key relationships.

However, in spite of measures implemented to ensure data quality, over time certain errors, inconsistency, and inaccuracy may creep into the data. The cause of degradation of data quality may be caused by various data quality problems, such as data entry errors, limited validation of data at the time of entry, system field limitations, mergers and migrations, data repository migrations across various database management systems vendors, inconsistent standards, discrepancies in data format, difference in structure of data repositories, missing data, data fields filled with default values or nulls, spelling errors and data anomalies.

Poor data quality may adversely impact the functioning of the organization. For example the organization having a poor data quality may suffer from losses arising from extra costs to prepare reconciliations, delay or scrapping migration to a new system, failure to bill or collect receivables, inability to deliver orders, failure to meet contracts and so on.

SUMMARY

This summary is provided to introduce concepts related to data quality analysis, and the concepts are further described below in the detailed description. This summary is not intended to identify essential features of the claimed subject matter nor is it intended for use in determining or limiting the scope of the claimed subject matter.

In one implementation, a method to assess data quality score of data stored in a data repository is provided. The method includes identifying at least one column of the data repository based on an importance index associated with the at least one column, wherein the importance index is indicative of the criticality of the data stored in the at least one column; and retrieving from a rules repository, at least one data quality analysis rule based on the category of data stored in the at least one column. The method further comprises assigning a rule weightage parameter to each of the at least one data quality analysis rule and a column weightage parameter to each of the identified at least one column; and analyzing the data stored in the at least one column based on the at least one data quality analysis rule. Based in part on the analysis a data quality score, indicative of the quality of data stored in the data repository is computed.

BRIEF DESCRIPTION OF THE DRAWINGS

The present subject matter and other features and advantages thereof will become apparent and may be better understood from the following drawings. The components of the figures are not necessarily to scales, emphasis instead being placed on better illustration of the underlying principle of the subject matter. Different numeral references on figures designate corresponding elements throughout different views. In the figure(s), the left-most digit(s) of a reference number identifies the figure in which the reference number first appears. The same numbers are used throughout the drawings to reference like features and components. The detailed description is described with reference to the accompanying figure(s).

DETAILED DESCRIPTION

Figure 1:
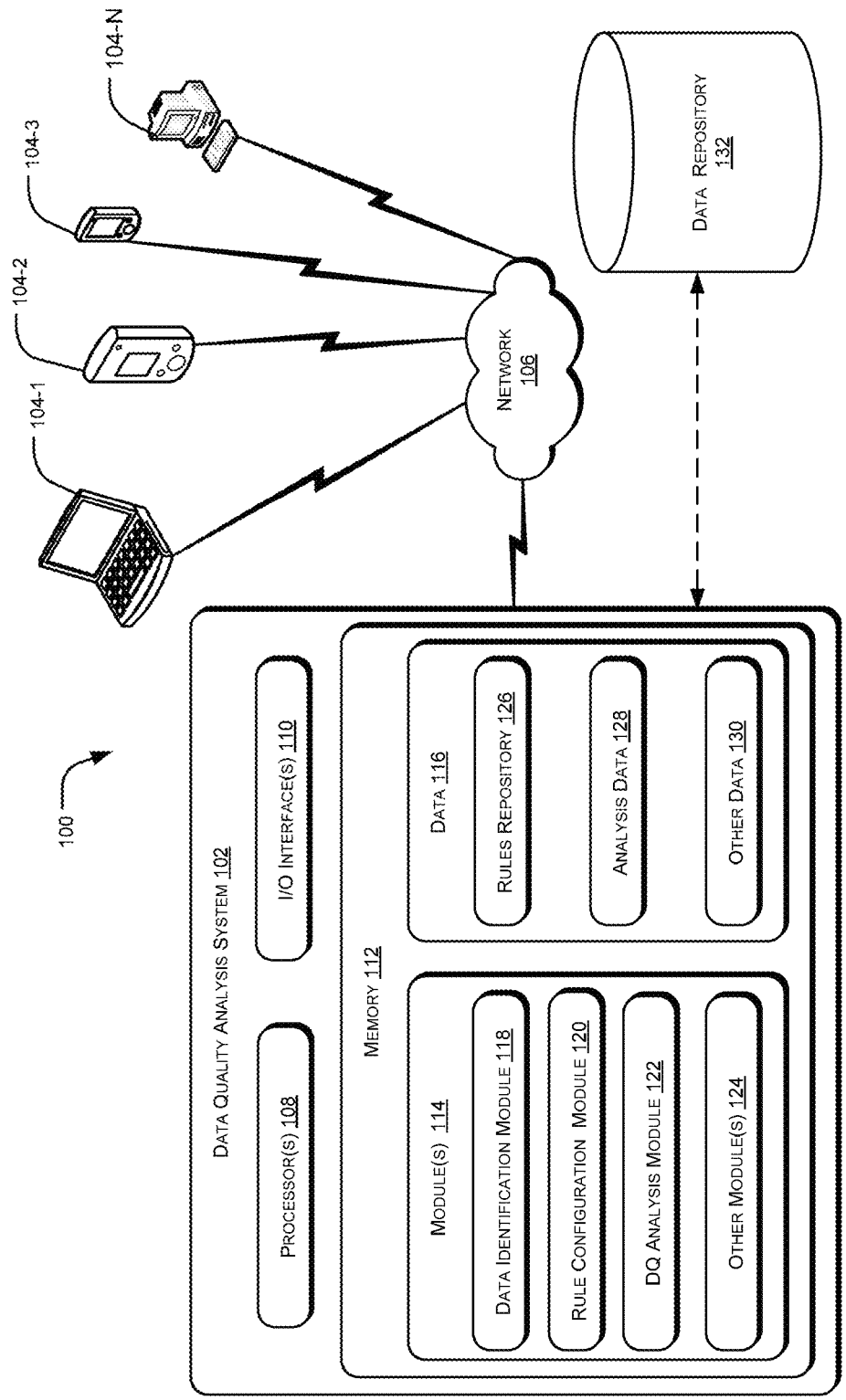
FIG. 1 illustrates the exemplary components of a data quality analysis system in a network environment, in accordance with an implementation of the present subject matter.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

Systems and methods for data quality analysis are described therein. The systems and methods can be implemented in a variety of computing devices, such as, laptops, desktops, workstations, tablet-PCs, smart phones, notebooks or portable computers, tablet computers, mainframe computers, mobile computing devices, entertainment devices, computing platforms, internet appliances and similar systems. However, a person skilled in the art will comprehend that the embodiment of the present subject matter are not limited to any particular computing system, architecture or application device, as it may be adapted to take advantage of new computing system and platform as they become accessible.

Data quality refers to the fitness of data to be used in various contexts. The data quality of data stored in a data repository may be based on various data quality parameters. For example, the data quality parameters may include relevance, indicative of the degree to which the data meets the current and potential users' requirements, accuracy of the data, accessibility and clarity of the data and so on. In recent time, most organizations use various systems and methods to manage their day to day working Examples of such software tools may include enterprise resource planning (ERP) systems, customer relationship management (CRM) systems, and supply chain management (SCM) systems. Each of these software tools is associated with various data repositories and has its own respective data model. Examples of data stored in the data repositories include customer data, transaction data, business research data, and so on.

It is well known, by those skilled in the art, that each of the software tools may use, retrieve and store the data in different formats. Further, in an organization, the various software tools, configured to manage the day to day working of the organization, are often interlinked. This makes it important that the data used and stored by each of these software tools are accurate, updated and consistent. However, with time, various data quality problems, such as data entry errors, limited validation of data at the time of entry, system field limitations, mergers and migrations, data repository migrations, inconsistent standards, discrepancies in data format, difference in structure of data repositories, missing data, data fields filled with default values or nulls, spelling errors and data anomalies degrade the quality of data.

Typically, quality of data is computed by measuring individual data elements against a plurality of data quality assessment parameters, which may be selected based on the type of data. Conventional data quality analysis tools usually have built-in data quality rules to check the quality of various types of data such as dates, financial data, transaction data, e-mail address, and postal addresses. However, often, the user may want to evaluate the data in the context of the user's usage of the data. The user may want to assign more importance to certain aspects of the data while assigning reduced importance to other aspects. For example, while sending e-brochures to customers, the user may focus more on the correctness of e-mail addresses of the customers; but may not focus on the correctness of the mobile numbers or contact number of the customers. The conventional data quality analysis tools offer limited flexibility to the user to analyze the quality of data based on the user's requirements.

The present subject matter describes systems and methods for data quality analysis. In one implementation, the quality of data stored in one or more data repositories is indicated by a data quality score. The data repositories may be implemented using any conventional database systems such as Sybase™, MySQL™, DB2™, SQL Server™, Oracle™. It should be appreciated by those skilled in the art that though the systems and methods for data quality are described in the context of determining data quality score, the same should not be construed as a limitation. For example, the systems and methods for data quality analysis may be implemented for various other purposes, such for determining data consistency, and determining compatibility of data repository with software tools.

In one implementation, the method of data quality analysis includes identifying the data to be analyzed for determining the data quality score. In said implementation, the tables which store the data important for determining the data quality score are identified. For example, in one implementation, the identification may be based on analysis or examination of the schema of the data repository. The schema may be understood to be the structure of the data repository, described in a formal language supported by the data repository, such as structured query language (SQL). In a relational database, the schema may also define the tables, the fields in each table, and the relationships between fields and tables. Once the important or critical tables have been identified, the columns, of each of the critical tables, storing the data important for determining the data quality score may be identified as critical columns. In one implementation, the critical columns may be identified based on pre-defined rules, such as the columns which have the primary key, unique values, and non-null columns. In another implementation, the critical columns may be selected by a user based on an importance index, assigned to each column, by the user, and indicative of the criticality of the data stored in the columns. For example, the data may be critical because incorrect data may cause malfunctioning of systems of the organization; non-compliance with certain statutory or regulatory compliances required by the jurisdiction in which the organization is operating; issues in facilitating customer service; and so on.

On identification of the important or the critical columns, the data stored in the critical columns may be analyzed based on one or more data quality analysis rules. In one implementation, the data quality analysis rules may be defined by the user based on the type of data stored in the critical columns. For example, the columns may store phone numbers, e-mail addresses, postal addresses, social security number and so on. The data quality analysis rules may be configured to analyze the data stored in the columns, based on the type of data stored in the columns. For example, if a column stores mobile numbers, the data quality analysis rules may be configured to determine, if the mobile number is a valid entity based on the number of digits; presence of non-numeric characters; duplicate values and so on.

Moreover, the user may also define various weightage parameters to each of the critical columns and each of the data quality rules. For example, a column weightage parameter may be associated with each of the critical columns and be indicative of the relative importance of the critical columns. Further a rule weightage parameter may be associated with each data quality analysis rule and may be indicative of the importance of the data quality analysis rule in determining the quality of data stored in the data repository.

Based on the data quality analysis rules, and the various weightage parameters, a data quality scorecard may be generated so as to indicate the quality of data stored in the data repository. In one implementation, the data quality scorecard may include a rule level data quality score, a column level data quality score, a table level data quality score, and a schema level data quality score. Further, in one implementation, the method may also include the number of null records present in the critical columns, and determine a revised data quality scorecard by only considering the number of non-null records as the total number of records. This may provide the user with an insight on the impact of null records on the quality of data.

Thus, the systems and methods for data quality analysis provide flexibility to the user to determine the quality of data stored in the data repository based on the context in which the user intends to use the data. These and other features of the present subject matter would be described in greater detail in conjunction with the following figures. While aspects of described systems and methods for data quality analysis may be implemented in any number of different computing systems, environments, and/or configurations, the embodiments are described in the context of the following exemplary system(s).

FIG. 1 illustrates an exemplary network environment 100 implementing a data quality analysis system 102, according to an embodiment of the present subject matter. In said embodiment, the network environment 100 includes the data quality analysis system 102 configured to determine the quality of data stored in one or more data repositories of an organization. In one implementation, the data quality analysis system 102 may be included within an existing information technology infrastructure system associated with the organization. The data quality analysis system 102 may be implemented in a variety of computing systems such as a laptop computer, a desktop computer, a notebook, a workstation, a mainframe computer, a server and the like. It will be understood that the data quality analysis system 102 may be accessed by various stakeholders, such as the database administrator, the software developers, the data quality analysts, and the support team, using client devices 104 or applications residing on client devices 104. Examples of the client devices 104 include, but are not limited to, a portable computer 104-1, a mobile computing device 104-2, a handheld device 104-3, a workstation 104-N, etc. As shown in the figure, such client devices 104 are communicatively coupled to the data quality analysis system 102 through a network 106 for facilitating one or more stakeholders to analyze the data quality analysis system 102.

The network 106 may be a wireless network, wired network or a combination thereof. The network 106 can be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further the network 106 may include a variety of network devices, including routers, bridges, servers, computing devices, storage devices, etc.

In one implementation, the data quality analysis system 102 includes a processor 108, input-output (I/O) interface(s) 110, and a memory 112. The processor 108 is coupled to the memory 112. The processor 108 may be implemented as one or more microprocessors, microcomputers, microcontrollers, digital signal processors, central processing units, state machines, logic circuitries, and/or any devices that manipulate signals based on operational instructions. Among other capabilities, the processor 108 is configured to fetch and execute computer-readable instructions stored in the memory 112.

The I/O interface(s) 110 may include a variety of software and hardware interfaces, for example, a web interface, a graphical user interface, etc., allowing the query processing system 102 to interact with the client devices 104. Further, the I/O interface(s) 110 may enable the data quality analysis system 102 to communicate with other computing devices, such as web servers and external data servers (not shown in figure). The I/O interface(s) 110 can facilitate multiple communications within a wide variety of networks and protocol types, including wired networks, for example LAN, cable, etc., and wireless networks such as WLAN, cellular, or satellite. The I/O interface(s) 110 may include one or more ports for connecting a number of devices to each other or to another server.

The memory 112 can include any computer-readable medium known in the art including, for example, volatile memory (e.g., RAM), and/or non-volatile memory (e.g., EPROM, flash memory, etc.). In one embodiment, the memory 112 includes module(s) 114 and program data 116. The module(s) 114 further include a data identification module 118, a rule configuration module 120, a data quality analysis module 122, henceforth referred to as the DQ module 122, and other module(s) 124. It will be appreciated that such modules may be represented as a single module or a combination of different modules. Additionally, the memory 112 further includes data 116 that serves, amongst other things, as a repository for storing data fetched processed, received and generated by one or more of the module(s) 114. The data 116 includes, for example, a rule repository 126, analysis data 128, and other data 130. In one embodiment, the rule repository 126, the analysis data 128, and the other data 130, may be stored in the memory 112 in the form of data structures. Additionally, the aforementioned data can be organized using data models, such as relational or hierarchical data models.

In one implementation, the network environment 100 also includes a data repository 132, which stores data, the quality of which has to be computed by the data quality analysis system 102. Though the data quality analysis system 102 has been shown to be connected with the data repository 132, it should be appreciated by those skilled in the art, that in other implementations, the data repository 132 may be an integral part of the data quality analysis system 102 or the data repository 132 may be connected to the data quality analysis system 102 through a communication network such as the network 106.

In operation, the data identification module 118 may be configured to identify important schemas of the data repository 132 based on at least one of a data identification rule retrieved form the rule repository 126 or user input. The data identification module 118 may be further configured to identify the important tables, within the identified schema. Identification of important tables, which are to be analyzed for evaluating the quality of data reduces the volume of data to be analyzed, thus reducing the processing load on the data quality analysis system 102 and helps in making the determination of data quality process fast. The data identification module 118 may be also configured to determine the important columns, which store the data critical for determining the quality of data. In one implementation, the user may associate an importance index, with each important column, wherein the importance index would be indicative of the criticality of the data stored in the column. In one implementation, the critical columns may be identified by the data identification module 118 based on pre-defined rules, such as the columns which have the primary key, unique values, and non-null columns.

On identification of the critical columns for evaluation of data quality, the rule configuration module 120 may be configured to retrieve various data quality analysis rules retrieved from the rules repository 126. In one implementation, the rule configuration module 120 may be configured to facilitate the user to define various data analysis rules for determining the quality of data stored in the data repository 132. For example, the data quality rule to check mobile numbers may be based on the number of digits, the presence of non-numeric characters, non-unique entries, and so on. The rule configuration module 120 may also facilitate the user to define various weightage parameters associated with the critical columns and/or the data quality analysis rule. For example, the rule configuration module 120 may facilitate the user to define various column weightage parameters, indicative of the relative importance of a critical column as compared other critical columns. Further, the user may also define rule based weightage parameter, indicative of the importance of a particular data quality analysis rule with respect to one or more critical columns. For example, a data quality analysis rule which checks for absence of special characters may have more importance when evaluating mobile numbers and have less importance when evaluating postal addresses. In one implementation, the user defined data quality analysis rules and various weightage parameters defined by the user may be stored as the rules repository 126. Table 1 shows an exemplary rule weightage parameter for the defined data quality analysis rule.

TABLE 1

| Data Quality Analysis Rule Name | Rule Weightage Parameter (CRWi) |
|---|---|
| NULL Values Identification | 9 |
| Only Special Characters Identification | 9 |
| Only Spaces Identification | 7 |
| Distinct Values Identification | 5 |
| Invalid Mobile number Identification | 10 |
| Check for Alphabets | 5 |

TABLE 1-continued

| Data Quality Analysis Rule Name | Rule Weightage Parameter (CRWi) |
|---|---|
| Check for Only Zero's | 5 |
| Check for repetition of numbers | 5 |

Based on one or more data quality analysis rules and the defined weightage parameters, the DQ analysis module 122 may be configured to analyze the data stored in the critical columns for determining a data quality scorecard. In one implementation, the DQ analysis module 122 may be configured to determine the percentage of records complying with a said data quality analysis rule with respect to the total records and store the same in the analysis data 128 as MVP. Further, the user may also set an expected percentage of records complying with a said data quality analysis rule with respect to the total records as the EVP. Table 2 shows an exemplary way of determining a column level rule data quality score, represented as CRQi.

TABLE 2

| Expected Condition | Actual Values | Column Level Rule Data Quality Score (CRQi) |
|---|---|---|
| Equal To | MVP = EVP | 100 |
|  | MVP <> EVP | 0 |
| Less Than Or Equal To | MVP <= EVP | 100 |
|  | MVP > EVP | 100 * (100 − MVP)/ (100 − EVP) |
| Greater Than Or Equal To and Zero Tolerance = No | MVP >= EVP | 100 |
|  | MVP < EVP | (100 * MVP)/EVP |
| Less Than Or Equal To and Zero Tolerance = Yes | MVP <= EVP | 100 |
|  | MVP > EVP | 0 |
| Greater Than Or Equal To and Zero Tolerance = Yes | MVP >= EVP | 100 |
|  | MVP < EVP | 0 |

Further, each critical column may be evaluated by more than one data quality analysis rule. Table-3 below provides an exemplary computation of the CRQi of a critical column storing mobile numbers.

TABLE 3

| Data Quality Analysis Rule Name | EVP (in percentage) | Zero Tolerance | MVP (in percentage) | CRQi |
|---|---|---|---|---|
| Null Values Identification | <=10 | No | 20 | 88.89 |
| Null Values Identification | <=10 | No | 10 | 100 |
| Null Values Identification | <=10 | No | 5 | 100 |
| Null Values Identification | <=10 | Yes | 20 | 0 |
| Distinct Values Identification | =10 | NA | 20 | 0 |
| Distinct Values Identification | =10 | NA | 9 | 0 |
| Distinct Values Identification | =10 | NA | 10 | 100 |

The DQ analysis module 122 may compute the data quality score for each critical column of the data repository 132. For the sake of explanation, the computed data quality score for the $j^{th}$ column is represented by CQj. In one implementation, the DQ analysis module 122 may determine the CQj based on equation 1.

$$CQj = (\Sigma CRWi * CRQi)/\Sigma CRWi \quad \text{Equation 1}$$

For example, Table 4 below shows an exemplary data quality analysis for a column storing mobile numbers.

TABLE 4

| Data Quality Analysis Rule Name | CRWi | CRQi |
|---|---|---|
| NULL Values Identification | 9 | 90 |
| Only Special Characters Identification | 9 | 85 |
| Only Spaces Identification | 7 | 95 |
| Distinct Values Identification | 5 | 80 |
| Invalid Mobile number Identification | 10 | 85 |
| Check for Alphabets | 5 | 96 |
| Check for Only Zero's | 5 | 100 |
| Check for repetition of numbers | 5 | 70 |

Thus, based on the equation 1, the DQ analysis module 122 determines the $\Sigma$ CRWi to be 55 and the ($\Sigma$ CRWi*CRQi) to be 4820 and computes CQj to be 87.64. Further, the various values of CRQi may be colour coded by the DQ analysis module 122. For example, the DQ analysis module 122 may be configured to consider CRQi from 90-100 as good and colour coded in "Green", whereas CRQi from 75-89.99 may be considered as average and colour coded in "Amber". Further, CRQi below 75 may be considered as unacceptable and colour coded in "Red".

Further, the DQ analysis module 122 may be configured to determine a table level data quality score, represented by TDQS. For example, consider as table having the critical columns "Customer ID", "Name", "Gender", "Mobile Number", and E-Mail Address". As mentioned earlier, each critical column may be associated with the column weightage parameter, represented by theCWj. Table 5 shows an exemplary evaluation of the critical columns of a table and the associated column weightage parameter.

TABLE 5

| Column Name | CWj | CQj |
|---|---|---|
| Customer ID | 9 | 100 |
| Name | 9 | 97 |
| Gender | 5 | 75 |
| Mobile Number | 7 | 87.64 |
| Email ID | 7 | 70 |

In one implementation, the DQ analysis module 122 may determine the TDQS based on equation 2.

$$TDQS = (\Sigma CWj * CQj)/\Sigma CWj \quad \text{Equation 2.}$$

In the above example, the $\Sigma CWj$ is 37, whereas the ($\Sigma CWj*CQj$) is 3251.48. Thus the TDQS is 87.88. In one implementation, the DQ analysis module 122 may be configured to color code the TDQS in a similar manner to the CQj.

Further, the DQ analysis module 122 may be configured to determine a schema level data quality score, represented by SDQS. As mentioned earlier, each table of the schema may have an importance index, represented as TWj, associated with it. For example, say a schema has the critical tables as Customer Master, Product Master, Transactions Data, and Transaction Details. Table 6 shows an exemplary analysis performed for determining the SDQS.

TABLE 6

| Table Name | TWj | TDQSj |
|---|---|---|
| Customer Master | 9 | 87.88 |
| Product Master | 9 | 90.5 |
| Transactions | 5 | 98 |
| Transaction Details | 7 | 88 |

In one implementation, the DQ analysis module 122 may determine the SDQS based on equation 3.

$$SDQS=(\Sigma TWj*TDQSj)/\Sigma TWj \quad \text{Equation 3.}$$

In the above example, the $\Sigma TWj$ is 30, whereas the $(\Sigma TWj*TDQSj)$ is 2711.42. Thus the SDQS is 90.38. In one implementation, the DQ analysis module 122 may be configured to color code the SDQS in a similar manner to the $CQj$.

In certain cases, the DQ analysis module may be configured to determine the data quality scores by excluding the null records. For example, the mobile number entry in a record may be empty is an alternate contact number is available. Thus the blank record of mobile number may not be important. Thus, the DQ analysis module may be configured to revise the total records to be total number of non null records and update the data quality scores accordingly.

Thus the data quality analysis system 102 facilitates determination of data quality scores at various granularity levels of the data repository 132. Further, the data quality analysis system 102 facilitates assigning of importance to portions of data based on the importance of the said data in the context of usage.

Figure 2:
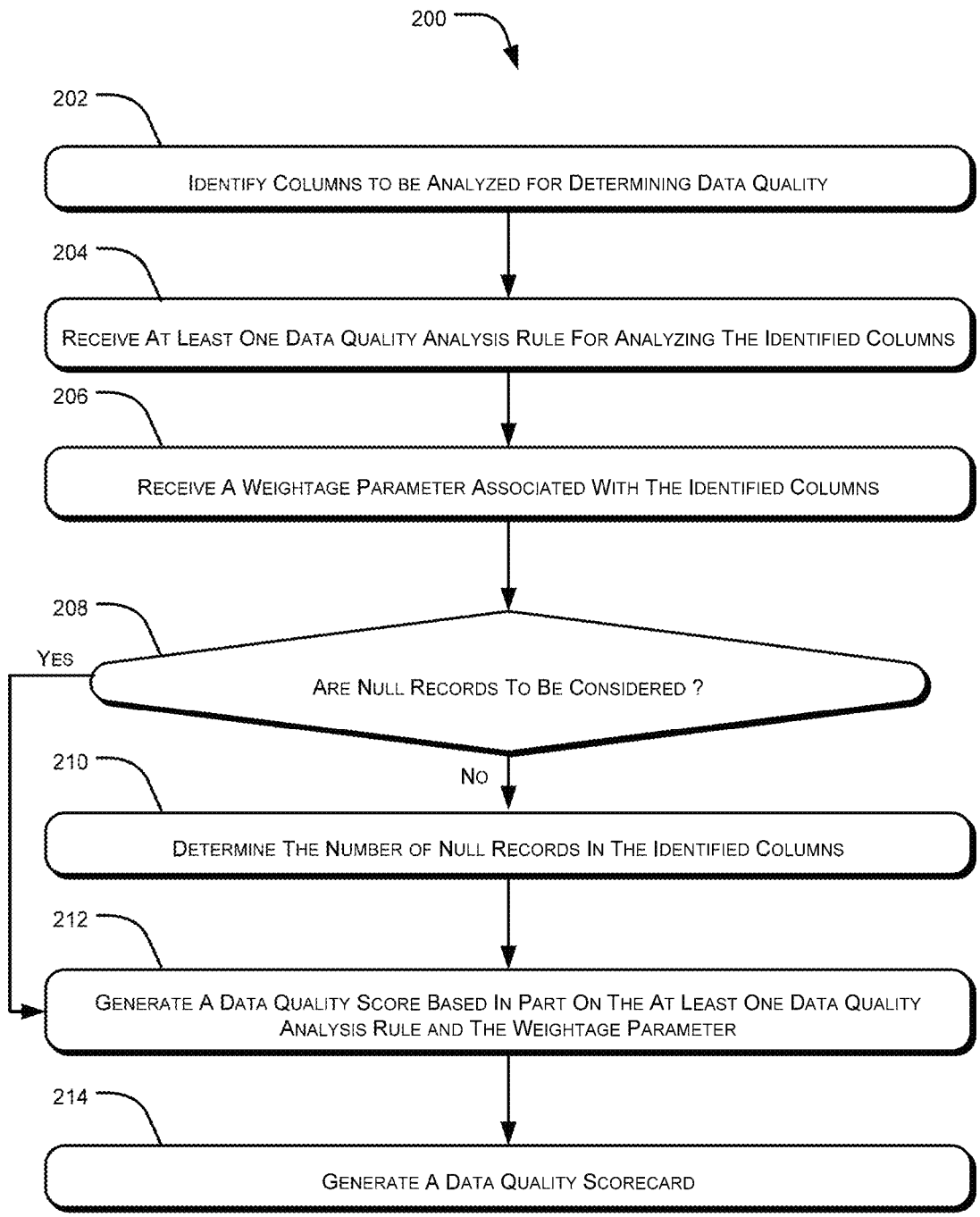
FIG. 2 illustrates a method for data quality analysis, in accordance with an implementation of the present subject matter.

FIG. 2 illustrates a method 200 of data quality analysis, in accordance with an implementation of the present subject matter. The exemplary method may be described in the general context of computer executable instructions. Generally, computer executable instructions can include routines, programs, objects, components, data structures, procedures, modules, functions, and the like that perform particular functions or implement particular abstract data types. The method may also be practiced in a distributed computing environment where functions are performed by remote processing devices that are linked through a communication network. In a distributed computing environment, computer executable instructions may be located in both local and remote computer storage media, including memory storage devices.

The order in which the method is described is not intended to be construed as a limitation, and any number of the described method blocks can be combined in any order to implement the method, or alternate methods. Additionally, individual blocks may be deleted from the method without departing from the spirit and scope of the subject matter described herein. Furthermore, the method can be implemented in any suitable hardware, software, firmware, or combination thereof. The method described herein is with reference to the data quality analysis system 102; however, the method can be implemented in other similar systems albeit with a few variations as will be understood by a person skilled in the art.

At block 202, the columns which are to be analyzed for determining the quality of data are identified as critical columns. In one implementation, critical columns are identified based on the importance of the able and the schema in which the columns are located. In one implementation, the data identification module 118 may be configured to determine the critical columns for determining the data quality.

At block 204, at least one data quality analysis rule is retrieved. In one implementation, the at least one data quality analysis rule may be configured to evaluate the data stored in the identified critical columns.

As shown in block 206, at least one weightage parameter is received. In one implementation, the weightage parameter may be retried from a rules repository 126, wherein in other implementations, the weightage parameter may be provided by the user. The weightage parameter may be further classified as column weightage parameter and rule weightage parameter. The column weightage parameter may be indicative of the importance of one critical column with respect to the other critical columns, whereas the rule weightage parameter may be indicative of the importance of a data quality rule in determining the quality of data stored in a critical column.

As illustrated in block 208, it is determined if null records are to be considered while determining the quality of data. If at block 208, it is determined that null records are not to be considered, then as depicted in block 210, the number of null records in the identified critical columns are determined and as depicted in block 212, one or more data quality scores are generated. In this computation, the total number of records is taken to be the total number of non-null records.

If at block 208, it is determined that null records are to be considered, then as depicted in block 212, one or more data quality scores are generated. In this case, the total number of records includes non-null records. The data scores computed at block 212 may be a column level data score, a table level data score, or a schema level data score.

As illustrated in block 214, a data quality scorecard may be generated based on the computed data quality scores. For example, the data quality scorecard may color code the data quality scores to give the user an insight of the quality of data.

Although implementations of data quality analysis and determination of data quality score have been described in language specific to structural features and/or methods, it is to be understood that the present subject matter is not necessarily limited to the specific features or methods described. Rather, the specific features and methods are disclosed as implementations for data quality analysis.

We claim:

1. A computer implemented method of determining quality of data stored in a data repository comprising:
   identifying a plurality of tables storing data important for determining quality of data stored therein, wherein the identifying the plurality of tables is based on schema of the data repository;
   further determining critical tables from amongst the plurality of identified tables by analyzing the plurality of tables, based on the analysis rules;
   identifying at least one critical column of data, form amongst the critical tables, stored in a data repository, based on one of an importance index associated with the at least one critical column and based on predefined rules, wherein the importance index is indicative of the sensitivity of the data stored in the at least one critical column, and wherein the at least one critical column stores data important for determining a data quality score;
   retrieving from a rules repository, at least one data quality analysis rule based on a category of data stored in the at least one critical column;
   assigning a rule weightage parameter to each of the at least one data quality analysis rule retrieved from the rules repository;
   assigning a column weightage parameter to each of the identified critical column;
   analyzing the data stored in the at least one identified column based on the at least one data quality analysis rule retrieved from the rules repository; and
   computing a data quality score, indicative of the quality of data stored in the data repository, based in part on the analyzing, the rule weightage parameter and the column weightage parameter, wherein the data quality score is at least one of a rule level data quality score, a column level data quality score, a table level data quality score, and a schema level data quality score.

2. The method as claimed in claim 1 further comprising:
   determining whether there are any null records in the at least one critical column; and computing a revised data quality score, based on the number of null records, on null records being determined in the at least one critical column.

3. The method as claimed in claim 1 wherein one of the at least one data quality analysis rule, the rule weightage parameter and the column weightage parameter is user-defined.

4. A data quality analysis (DQA) system, configured to determine the quality of data stored in a data repository comprising:
a processor; and
a memory coupled to the processor, the memory comprising
a data identification module configured to,
identify a plurality of tables storing data important for determining quality of data stored therein, wherein the identifying the plurality of tables is based on schema of the data repository;
further determining critical tables from amongst the plurality of identified tables by analyzing the plurality of tables, based on the analysis rules;
further identify at least one critical column of the data repository, from amongst the critical tables, based on one of an importance index associated with the at least one critical column and based on predefined rules, wherein the importance index is indicative of the sensitivity of the data stored in the at least one critical column;
a rule configuration module configured to,
retrieve from a rules repository, at least one data quality analysis rule based on the category of data stored in the at least one critical column;
assign a rule weightage parameter to each of the at least one data quality analysis rule;
assigning a column weightage parameter to each of the identified at least one critical column; a data quality (DQ) analysis module configured to
analyze the data stored in the at least one critical column based on the at least one data quality analysis rule; and
compute a data quality score, indicative of the quality of data stored in the data repository, based in part on the analysis, the rule weightage parameter and the column weightage parameter, wherein the data quality score is at least one of a rule level data quality score, a column level data quality score, a table level data quality score, and a schema level data quality score.

5. The DQA system as claimed in claim 4, wherein the rule configuration module is further configured to facilitate the user to define at least one of the at least one data quality analysis rule, the rule weightage parameter and the column weightage parameter.

6. The DQA system as claimed in claim 4, wherein the analysis module is further configured to determine whether there are any null records in the at least one critical column; and compute a revised data quality score, based on the number of null records, on null records being determined in the at least one column.

7. A computer-readable medium having embodied thereon a computer program for executing a method comprising:
identifying a plurality of tables storing data important for determining quality of data stored therein, wherein the identifying the plurality of tables is based on schema of the data repository, and wherein the identifying further comprises analyzing the tables, based on the analysis rules, to determine critical tables;
further identifying at least one critical column of data stored in a data repository based on one of an importance index associated with the at least one critical column and based on predefined rules, wherein the importance index is indicative of the sensitivity of the data stored in the at least one critical column;
retrieving from a rules repository, at least one data quality analysis rule based on a category of data stored in the at least one critical column;
assigning a rule weightage parameter to each of the at least one data quality analysis rule retrieved from the rules repository;
assigning a column weightage parameter to each of the identified critical column;
analyzing the data stored in the at least one identified critical column based on the at least one data quality analysis rule retrieved from the rules repository; and
computing a data quality score, indicative of the quality of data stored in the data repository, based in part on the analyzing, the rule weightage parameter and the column weightage parameter, wherein the data quality score is at least one of a rule level data quality score, a column level data quality score, a table level data quality score, and a schema level data quality score.

* * * * *